May 6, 1924.
L. B. KOLB
1,492,639
SEED GATHERER
Filed April 27, 1921  2 Sheets-Sheet 1
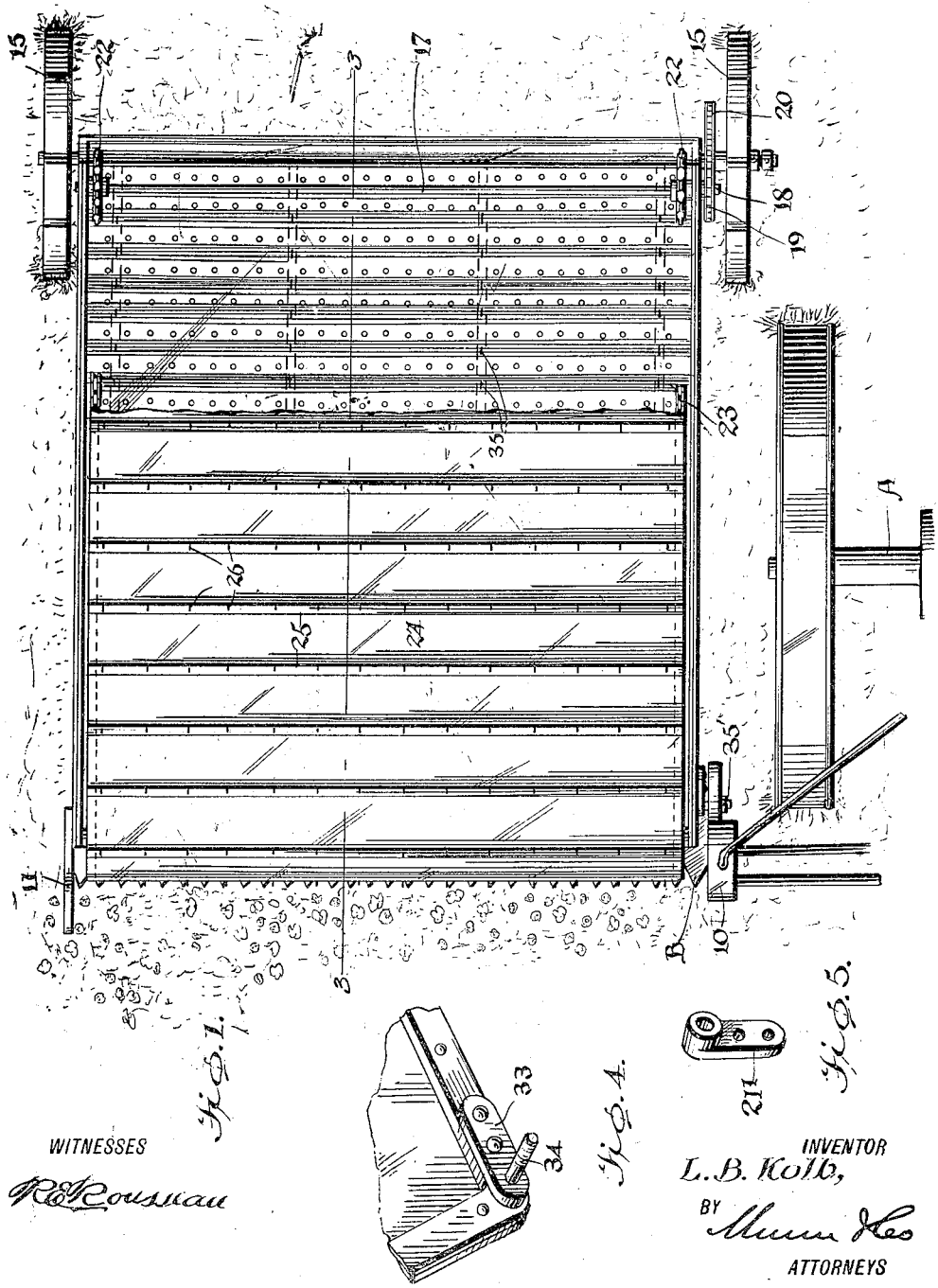
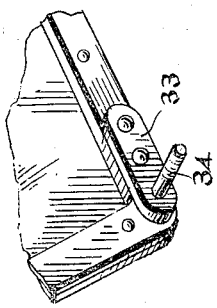
WITNESSES
R.E.Rousseau
INVENTOR
L.B. Kolb,
BY
ATTORNEYS

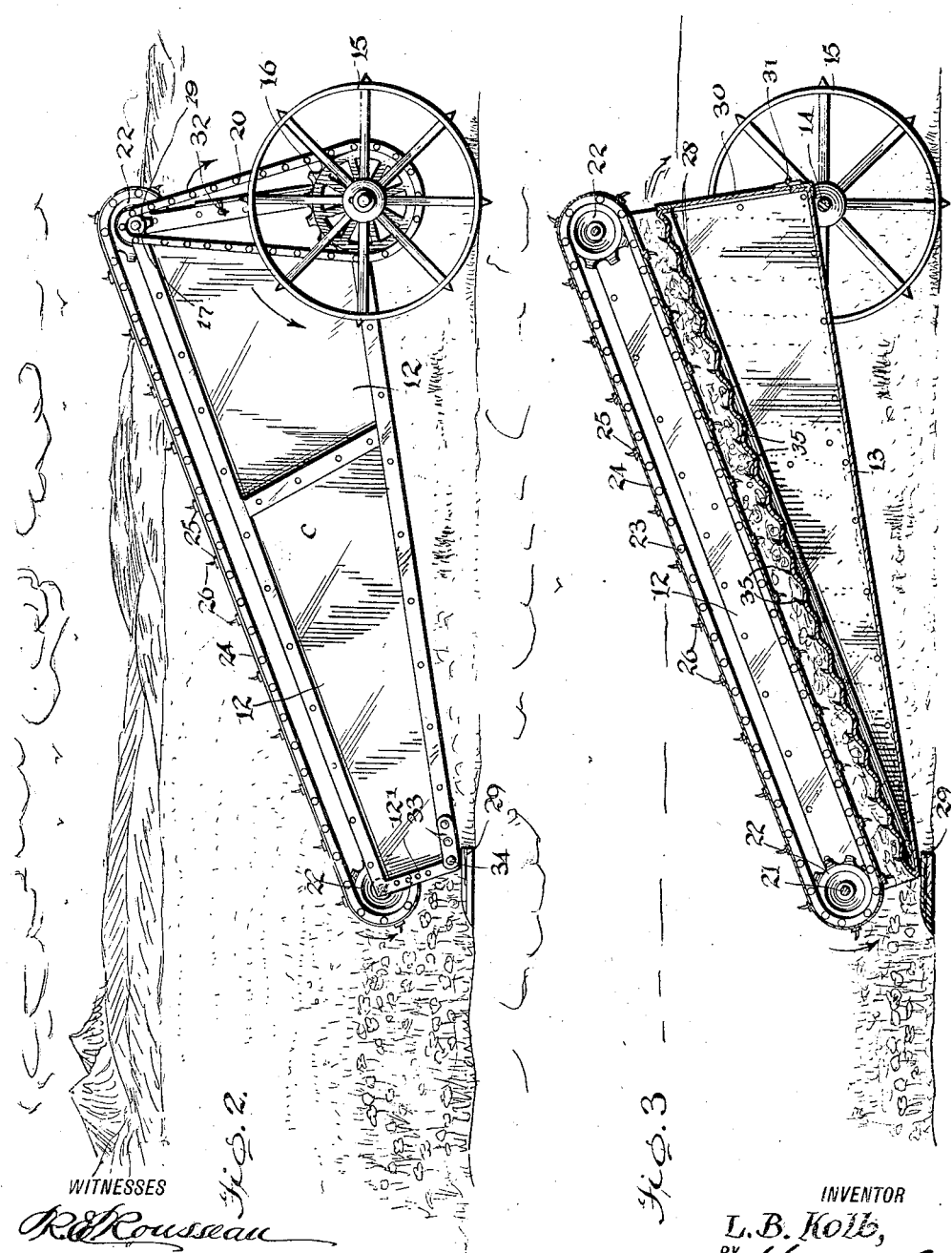

Patented May 6, 1924.

1,492,639

UNITED STATES PATENT OFFICE.

LAWRENCE BOYD KOLB, OF ABERDEEN, MISSISSIPPI.

SEED GATHERER.

Application filed April 27, 1921. Serial No. 464,788.

To all whom it may concern:

Be it known that I, LAWRENCE B. KOLB, a citizen of the United States, and a resident of Aberdeen, in the county of Monroe and State of Mississippi, have invented certain new and useful Improvements in Seed Gatherers, of which the following is a specification.

This invention relates to a seed gatherer which is particularly adapted for gathering seeds from a short stemmed growth, such as clover or the like.

The object of the invention is to provide a seed gatherer which may be quickly and easily attached to the finger bar of a mowing machine, and operated for separating and collecting seed from the growth being severed by the cutting bar.

It is also an object of the invention that the seed gatherer be light in weight and durable and also efficient in operation.

Other objects and objects relating to details of construction, combination and arrangement of parts will hereinafter appear in the detailed description to follow.

The invention is illustrated by way of example in the accompanying drawings, in which—

Figure 1 is a top plan view of the invention as when connected to the cutting bar of a mowing machine, with parts thereof broken away to more clearly illustrate the invention.

Figure 2 is a side elevation of the same,

Figure 3 is a vertical longitudinal section of the seed gatherer as when connected to the cutting bar of a mowing machine, Figure 4 is a detail view of the connecting element which secures the seed gatherer to the finger bar of the mowing machine, Figure 5 is a detail view of one of the bearings for the forward sprocket shaft.

Referring to the drawings more particularly, A indicates generally a mowing machine and B the finger bar extending therefrom. The finger bar B is of the conventional type having the usual shoe 10 at its inner end and the guard 11 at its outer end.

In carrying out my invention, I provide a frame structure as generally indicated at C, said structure comprising the two side walls 12 and a bottom 13. The ends of the structure are open and likewise the top thereof. The upper edges of the side walls 12 of the structure are inclined upwardly and rearwardly, as shown in Figure 2. An axle 14 is suitably journaled to the rear end of the frame structure transversely thereof and on each end of the axle there is suitably fixed a wheel 15. Adjacent one of the wheels 15 there is fixed to the axle 14 a drive sprocket 16. Between the upper rear ends of the sides 12 of the frame structure there extends a shaft 17, said shaft having its ends suitably journaled in the sides 12 and one end extended sufficiently as at 18 to carry a sprocket 19, said sprocket being in alinement with the drive sprocket 16. A sprocket chain 20 operatively connects the drive sprocket 16 with the sprocket 19 for rotating the shaft 17. Between the lower ends of the side walls 12 at the upper corners thereof there extends a shaft 21, said shaft being journaled at its ends in the bearing members 21', said bearing members 21' being adapted to be raised or lowered by passing the bolts by which they are secured to the side walls 12 through different openings in said side walls as indicated at 12'. Upon each shaft 21 and 17 there is fixed a pair of sprockets 22, said sprockets being positioned adjacent the inner sides of the walls 12. The sprockets of similar ends of the shaft are operatively connected by an endless sprocket chain 23. Between the sprocket chains 23 there is secured a canvas belt 24, said belt extending the entire length of the sprocket chains and carrying a plurality of strips 25 which are disposed transversely of the belt, and arranged in spaced relation the entire length thereof. The strips 25 each have extending therefrom a series of spikes 26, said spikes being arranged in spaced relation the entire length of the strips and each spike slightly bent near its point in a similar direction as shown.

Between the bottom 13 and the top of the side walls 12 of the frame structure there is positioned a transversely corrugated floor 28, said floor being entirely perforated as shown Figures 1 and 3. The corrugated floor is parallel with the slope or incline of the upper edges of the side walls 12. The corrugated floor 28 is preferably formed with the side walls 12 and its forward end intersecting the bottom 13, as shown at 29. The floor 28 forms with the side walls 12 and the bottom 13 a hopper in which seed may be collected. For the rear end of this hopper there is provided a door 30, said door being hinged at 31 and adapted to swing downwardly when open. Any suitable latch means may be employed for holding the door in its closed position as indicated at 32. Also the floor carries a series of rows of teeth 35 which extend in a direction opposite to the teeth 26 carried by the canvas 24.

For connecting the seed gatherer heretofore described to the finger bar of the mowing machine, there is bolted to the inner side wall 12 at the forward end thereof a short metal strip 33, said strip having extending therefrom a threaded stud 34 which projects through an opening formed in the rear end of the shoe 10 of the finger bar B. By the means of a nut 35' the inner side wall 12 of the gatherer is secured to the shoe 10 of the mower. Of course other means of connecting the seed gatherer to the finger bar may be employed, the present means only being offered as an example.

In the operation of the present device, as the mowing machine advances carrying with it its cutting bar the growth before said cutting bar is severed in the usual manner. The wheels 15 are of course rotated as the mowing machine moves forward and these in turn rotates the different sprocket wheels 22 for operating the belt 24. The teeth 26 upon said belt will engage the growth and carry the same upon the corrugated floor 28. The teeth being bent as shown will be inclined to slip over the growth which may be disposed upon the floor 28 and acting with the spikes 35 will give a rubbing action for relieving the growth of its seed. This action will continue until the seed is sufficiently separated from the growth, said seed dropping through the perforations of the floor 28 into the hopper therebelow.

While I have shown and described the preferred form of my invention it is to be understood that I am aware of the fact that the construction, combination and arrangement of parts may be changed by those skilled in the art without departing from the spirit of my invention, as indicated by the appended claims.

I claim:—

1. In a seed gatherer of the class described, a frame structure, a pair of wheels supporting the rear end of said frame structure, a perforated and corrugated floor supported by said frame structure, said floor being inclined upwardly and rearwardly from the forward end of the frame and its corrugations extending transversely with respect to said frame, an endless belt operatively supported above said floor and parallel therewith, a plurality of rows of teeth arranged transversely upon said belt, and a plurality of teeth carried by said floor whereby with the material being drawn over the floor the seed will be thrashed therefrom and fall through the perforations of said floor.

2. In a seed gatherer of the class described, a frame structure, a pair of wheels supporting the rear end of said frame structure, a perforated and corrugated floor supported by said frame structure, said floor being inclined toward the rear end of the frame and its corrugations extending transversely with respect to said frame, an endless belt operatively supported above said floor and parallel therewith, a plurality of rows of teeth arranged transversely upon said belt, and a plurality of teeth carried by said floor whereby with the material being drawn over the floor the seed will be thrashed therefrom and fall through the perforations of said floor, and a hopper beneath said floor extending the entire area thereof and adapted to receive seed falling through the perforations of said floor.

LAWRENCE BOYD KOLB.